(12) United States Patent
Matsumoto

(10) Patent No.: US 6,385,398 B1
(45) Date of Patent: May 7, 2002

(54) CAMERA WITH BLURRING DETECTION FUNCTION

(75) Inventor: Hisayuki Matsumoto, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 74 days.

(21) Appl. No.: 09/624,661

(22) Filed: Jul. 25, 2000

(30) Foreign Application Priority Data

Jul. 27, 1999 (JP) .......................................... 11-212185

(51) Int. Cl.⁷ ............................................. G03B 17/00
(52) U.S. Cl. ...................... 396/52; 396/104; 396/246
(58) Field of Search ............................ 396/52–55, 104, 396/246; 348/208; 359/554–557

(56) References Cited

U.S. PATENT DOCUMENTS

| | | | |
|---|---|---|---|
| 4,623,930 A | 11/1986 | Oshima et al. | 348/208 |
| 4,856,882 A | 8/1989 | Oshima et al. | 359/554 |
| 5,020,890 A | 6/1991 | Oshima et al. | 359/554 |
| 5,062,696 A | 11/1991 | Oshima et al. | 359/554 |
| 5,150,150 A | 9/1992 | Enomoto | 396/53 |
| 5,294,991 A | 3/1994 | Oshima et al. | 348/208 |
| 5,526,045 A | 6/1996 | Oshima et al. | 348/208 |
| 5,649,239 A * | 7/1997 | Tamekuni | 396/104 |
| 5,761,545 A | 6/1998 | Tanaka et al. | 396/55 X |
| 5,826,115 A * | 10/1998 | Washisu et al. | 396/55 |
| 6,081,668 A * | 6/2000 | Furuyama et al. | 395/55 |
| 6,148,150 A * | 11/2000 | Yajima et al. | 396/55 |

FOREIGN PATENT DOCUMENTS

| | | | |
|---|---|---|---|
| JP | 60143330 A | 7/1985 | G03B/19/00 |
| JP | 4024620 | 1/1992 | G03B/5/00 |
| JP | 5204012 | 8/1993 | G03B/5/00 |
| JP | 5216104 | 8/1993 | G03B/17/00 |
| JP | 5232562 | 9/1993 | G03B/17/00 |

* cited by examiner

Primary Examiner—W. B. Perkey
(74) Attorney, Agent, or Firm—Frishauf, Holtz, Goodman, Langer & Chick, P.C.

(57) ABSTRACT

A panning shot check unit checks whether a panning shot is succeeded or not on the basis of an output from a focal point detection unit for detecting an in-focus state of a photographing lens to output a focal point detection signal and an output from a blurring detection unit for detecting an amount of blurring acting on the camera. A shutter speed change unit changes a shutter speed to obtain the effect of a panning shot when it is determined by the panning shot check unit that the panning shot is succeeded. A control unit turns on a panning shot success display unit in a finder when it is determined by the panning shot check unit that the panning shot is succeeded so as to inform a photographer that the panning shot is succeeded.

28 Claims, 13 Drawing Sheets

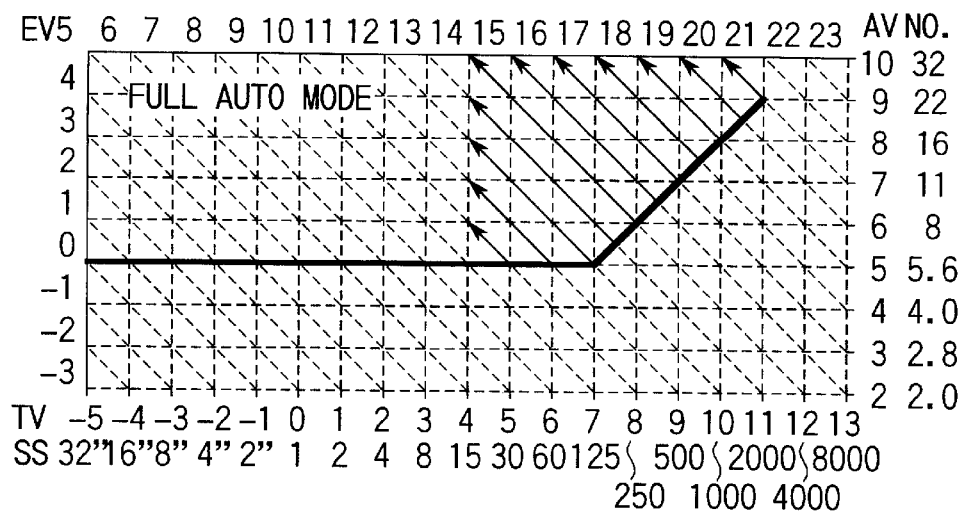

FIG. 17

| MODE | (a) | | (b) | |
|---|---|---|---|---|
| | EXPOSURE VALUE CHANGE | SUCCESS DISPLAY | EXPOSURE VALUE CHANGE | SUCCESS DISPLAY |
| FULL AUTO | IN-EXECUTION | ——— | EXECUTION | EXECUTION |
| PORTRAIT | IN-EXECUTION | ——— | EXECUTION | EXECUTION |
| LANDSCAPE | IN-EXECUTION | ——— | EXECUTION | EXECUTION |
| NIGHTSCAPE | IN-EXECUTION | ——— | EXECUTION | EXECUTION |
| SPORT | EXECUTION | EXECUTION | EXECUTION | EXECUTION |
| APERTURE PRIORITY | IN-EXECUTION | ——— | IN-EXECUTION | EXECUTION |
| SHUTTER PRIORITY | IN-EXECUTION | ——— | IN-EXECUTION | EXECUTION |
| MANUAL | IN-EXECUTION | ——— | IN-EXECUTION | EXECUTION |

FIG. 18

CAMERA WITH BLURRING DETECTION FUNCTION

CROSS-REFERENCE TO RELATED APPLICATIONS

This application is based upon and claims the benefit of priority from the prior Japanese Patent Application No. 11-212185, filed Jul. 27, 1999, the entire contents of which are incorporated herein by reference.

BACKGROUND OF THE INVENTION

The present invention relates to a camera having a function of detection an amount of blurring acting on the camera.

Conventionally, a camera (e.g., Japanese Patent Application KOKOKU No. 1-53957 Publication) which detects a blurring of a photographer acting on the camera and partially drives a photographing lens to cancel the blurring so as to correct the blurring and a camera (e.g., Registered Publication 2842662) which controls a shutter to open the shutter at a timing at a small blurring occurs so as to decrease the influence of the blurring are well known.

In a camera having a function of detecting such a blurring, when a so-called panning operation and a tilt operation for moving a camera body in one direction, a blurring detection sensor observes an amount of blurring which is considerably larger than that in a normal photographing operation in one direction. For this reason, it is also known that the panning operation or the tilt operation can be detected on the basis of an output from the blurring detection sensor.

As one of advanced techniques for photographing, a panning shot is known. This technique is a photographing method which performs a panning operation of a camera in accordance with the motion of an object moving in a lateral direction and performs exposure with a slow shutter during the operation to express a feeling of motion.

As a conventional technique related to the panning shot, the following techniques are known.

More specifically, a technique disclosed in Japanese Patent Application KOKAI Publication No. 5-216104 is as follows. That is, a high-frequency component is removed from an output from the blurring detection sensor to check whether the camera is in a panning state or not. If it is determined that the camera is in the panning state, a blurring correction device is prohibited from being operated.

A technique disclosed in Japanese Patent Application KOKAI Publication No. 5-232562 is as follows. That is, it is checked on the basis of an output from a blurring detection sensor whether a panning shot is performed or not, and a shutter speed appropriate to the panning shot is set.

In this manner, in both the conventional techniques, it is checked on the basis of an output from a blurring detection sensor whether a panning shot is performed or not.

However, according to the conventional technique disclosed Japanese Patent Application KOKAI Publication No. 5-216104 or No. 5-232562, it can be reliably checked whether the camera is in a panning state or not, but it cannot be checked whether a possibility that the panning shot be succeeded is high or not. More specifically, the check is performed on the basis of an output from only the blurring detection sensor, it is only understood that the camera performs a panning operation in a predetermined direction.

In this case, the state in which "panning shot is succeeded" is a state in which a moving object serving as a main object is photographed as a still image, and a background flows in the moving direction of the object. A state in which the background and the moving object flow together with each other does not mean that a panning shot is succeeded.

This photographing method is difficult for a beginner of a panning shot. The following problems are posed. That is, it cannot be understood that a panning shot is succeeded or not, or a shutter speed does not become slow when photographing is performed in a normal program mode, so that a picture having a slight feeling of motion is obtained.

BRIEF SUMMARY OF THE INVENTION

The present invention has been made in consideration of the above points, and has as its object to provide a camera which makes it possible that a photographer knows whether a panning shot is succeeded or not and which has a blurring detection function which can obtain a picture in which the improved effect of a panning shot is improved.

According to a first aspect of the present invention, there is provided a camera having a blurring detection function comprising:

a blurring detection unit for detecting an amount of blurring;

a focal point detection unit for detecting an in-focus state of a photographing lens to output a focal point detection signal; and a panning shot success check unit for checking whether a panning shot which photographs an object moving in a photographing screen is succeeded or not on the basis of outputs from the blurring detection unit and the focal point detection unit.

According to a second aspect of the present invention, there is provided a camera having a blurring detection function comprising:

a blurring detection unit for detecting an amount of blurring;

a focal point detection unit for detecting an in-focus state of a photographing lens to output a focal point detection signal;

a panning shot mode setting unit for setting the camera in a panning shot mode;

a panning shot success check unit for checking whether a panning shot is succeeded or not on the basis of outputs from the blurring detection unit and the focal point detection unit when the panning shot mode is set by the panning shot mode setting unit; and a vibration isolation mode setting unit for setting the camera in a vibration isolation mode.

According to a third aspect of the present invention, there is provided a camera having a blurring detection function comprising:

a blurring detection unit for detecting an amount of blurring;

a focal point detection unit for detecting an in-focus state of a photographing lens to output a focal point detection signal;

a panning shot mode setting member for setting the camera in a panning shot mode;

a panning shot success check unit for checking whether a panning shot is succeeded or not on the basis of outputs from the blurring detection unit and the focal point detection unit when the panning shot mode is set by the panning shot mode setting member;

a vibration isolation mode setting unit for setting the camera in a vibration isolation mode;

a photographing mode setting unit having at least a photographing mode in which an exposure value is set by the intention of a photographer;

a shutter speed change unit for changing a shutter speed from a high speed to a low speed when it is determined by the panning shot success check unit that the panning shot is succeeded; and a control unit for prohibiting an operation of the shutter speed change unit when the photographing mode in which the exposure value is set by the intention of the photographer is set by the photographing mode setting unit, and for permitting an operation of the shutter speed change unit when the photographing mode in which the exposure value is not set by the intention of the photographer is set by the photographing mode setting unit.

According to a fourth aspect of the present invention, there is provided a method of performing a panning shot process in a panning shot mode for photographing an object moving in a photographing screen in a camera having a blurring detection function, comprising:

a panning shot state check step for checking whether the camera is set in a panning shot state;

a focal point detection step for loading a plurality of outputs at different times from a focal point detection unit when it is determined in the panning shot check step that the camera is set in the panning shot state;

a correlation calculation step for performing a correlation calculation on the basis of the plurality of outputs loaded in the focal point detection step;

a panning shot success check step of checking whether a panning shot is succeeded or not on the basis of the correlation calculation in the correlation calculation step; and a display step of displaying that the panning shot is succeeded when it is determined in the panning shot success check step that the camera is set in the panning shot state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 17 is a program line diagram showing shutter speeds and numerical apertures in object brightnesses for explaining the subroutine of an exposure value change process in FIG. 16;

FIG. 18 is a table showing photographing modes, the execution or inexecution of a panning shot process, and the execution or inexecution of a success check display;

DETAILED DESCRIPTION OF THE INVENTION

Before the embodiments of the present invention are described in detail, the concept of the present invention will be described first to make it easy to understand the present invention.

Figure 1:
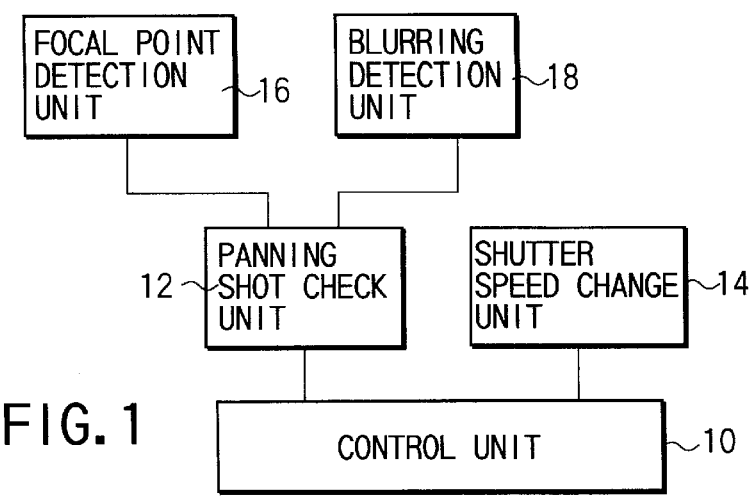
FIG. 1 is a block diagram showing the configuration of a camera having a blurring detection function according to the present invention.

FIG. 1 is a block diagram showing the configuration of a camera having a blurring detection function according to the present invention.

A panning shot check unit 12 and a shutter speed change unit 14 are connected to a control unit 10 for entirely controlling the camera having the blurring detection function. The panning shot check unit 12 checks, on the basis of an output from a focal point detection unit 16 for detecting a focusing state of a photographing lens to output a focal point detection signal and an output from a blurring detection unit 18 for detecting an amount of blurring acting on the camera, whether a panning shot is succeeded or not. If the panning shot check unit 12 determines that the panning shot is succeeded, the shutter speed change unit 14 changes a shutter speed to obtain the effect of the panning shot.

Figure 2:
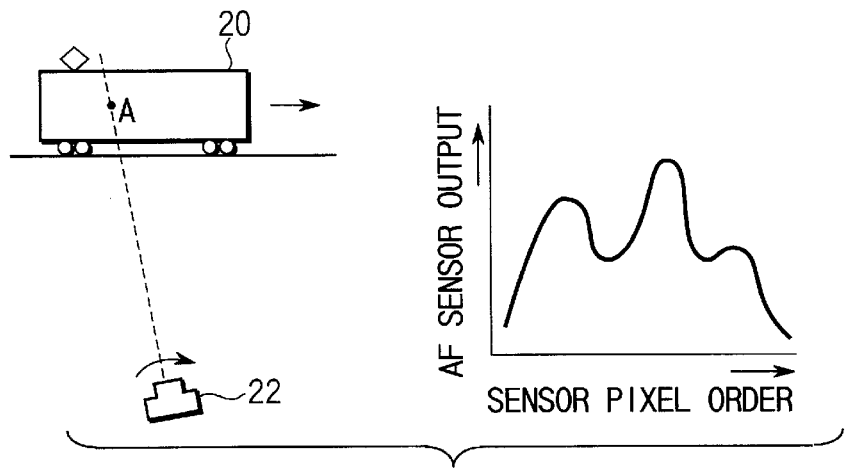
FIG. 2 is a diagram showing a photographing scene at certain time and an output from an AF sensor at this time.
Figure 3:
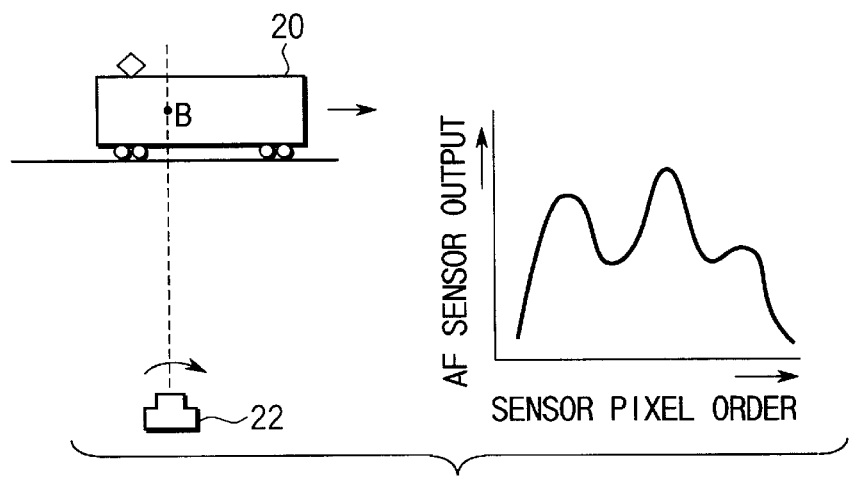
FIG. 3 is a diagram showing a photographing scene at time a predetermined period of time after the time shown in FIG. 2 and an output from the AF sensor at this time.
Figure 4:
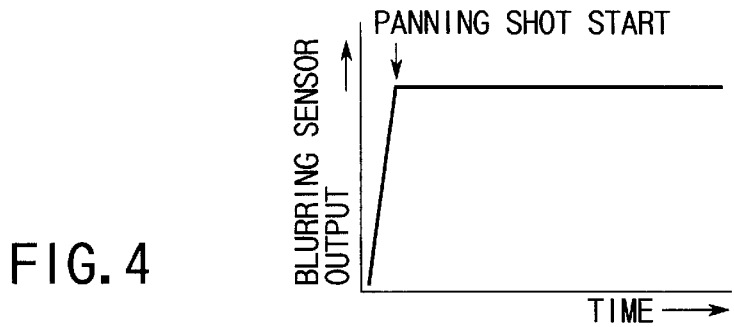
FIG. 4 is a graph showing an output from a blurring detection sensor during a panning operation.

Here, with reference to FIGS. 2 to 4, a method of checking whether a panning shot in the panning shot check unit 12 is succeeded or not.

More specifically, FIG. 2 is a diagram showing a photographing scene at certain time and an output from a focal point detection sensor (AF sensor) at this time. As shown in the left side of the diagram, an object 20 is a train. It is assumed that the train is running toward the right side on the sheet of paper. At this time, a photographer aims at point A of the object 20 as a focal point detection point, and is panning a camera 22 to photograph the object 20 by a panning shot. A focal point detection sensor output obtained at this time is shown on the right side of the diagram. The focal point detection sensor is a known line sensor having a plurality of pixels (to be described later). In the right portion of the diagram, the ordinate indicates an output, the abscissa indicates an array of pixels, and outputs from adjacent pixels are connected to each other with lines.

On the other hand, FIG. 3 shows a photographing scene at time a predetermined period of time after the time shown in FIG. 2 and an output from the focal point detection sensor at this time. In this case, a photographer aims at point B of the object 20 as a focal point detection point. As in FIG. 2, the photographer is panning the camera 22 to photograph the object 20 by a panning shot.

Here, if the panning shot is succeeded (the panning shot is probably succeeded), the point A and the point B are almost equal to each other. A focal point detection sensor output at this time, as shown in the right portion in FIG. 3, is almost equal to the focal point detection sensor output in FIG. 2. In contrast to this, if the panning shot is not succeeded (the panning shot probably fails), the point A is different from the point B. Although not shown, a focal point detection sensor at this time is different from that in FIG. 2.

A state in which "panning shot is succeeded" is, as described above, a state in which a moving object serving as a main object is photographed as a still image, and a background flows to express a feeling of motion.

In order to perform such a panning shot, a photographer presses the release switch after the state in FIG. 3 to shift to an exposure operation.

FIG. 4 shows an output from a blurring detection sensor in a panning operation. The blurring detection sensor used here is a known angular velocity sensor (to be described later) which essentially control a camera such that a blurring in photographing is detected to decrease of the influence of the blurring. Therefore, in a state in which an extremely large blurring occurs in a panning operation or the like, an output from the blurring detection sensor is an output which is always saturated as in FIG. 4.

In the present invention, the panning shot check unit 12 determined that a panning shot may be performed when an output from the blurring detection sensor represents the panning state shown in FIG. 4. In this case, the panning shot check unit 12 evaluates outputs from the focal point detection sensor at different times as shown in FIGS. 2 and 3 to check whether the panning shot is succeeded (the panning shot is probably succeeded) or not (the panning shot probably fails).

Embodiments of the present invention will be described below with reference to the accompanying drawings.

[First Embodiment]

Figure 5:
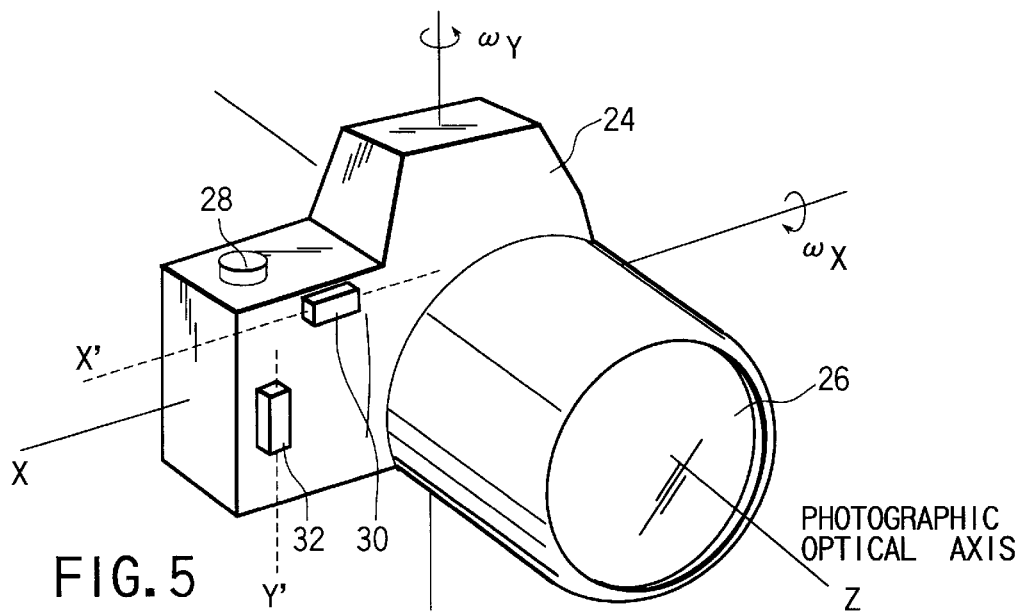
FIG. 5 is a view showing the appearance of a camera having a blurring detection function according to the first embodiment of the present invention.

FIG. 5 is a view showing the appearance of a camera having a blurring detection function according to the first embodiment of the present invention. Referring to FIG. 5, reference numeral 24 denotes a camera body. A photographing lens 26 is arranged in front of the camera body 24, and a release switch 28 is arranged at a predetermined position of the upper surface of the camera body 24. Here, the release switch 28 is pressed in two steps. When the release switch 28 is half-pressed, a first release (to be referred to as a 1R hereinafter) is turned on to perform a focusing operation and a photometric operation. When the release switch 28 is fully pressed, a second release (to be referred to as a 2R hereinafter) is turned on to perform an exposure operation.

Two blurring detection sensors, i.e., an X-axis blurring detection sensor 30 and a Y-axial blurring detection sensor 32 are stored inside the camera body 24. These blurring detection sensors are known angular velocity sensors, for example.

The X-axis blurring detection sensor 30 is arranged along an X'-axis parallel to an image surface X-axis perpendicular to a Z-axis corresponding to a photographic optical axis to detect an angular velocity ($\omega_x$) about the X-axis. More specifically, the X-axis blurring detection sensor 30 detects a blurring in the direction of an image surface Y-axis. The Y-axis blurring detection sensor 32 is arranged along a Y'-axis parallel to an image surface Y-axis perpendicular to both the X and Z axes to detect an angular velocity ($\omega_y$) about the Y-axis. More specifically the Y-axis blurring detection sensor 32 detects a blurring in the direction of the image surface X-axis.

Figure 6:
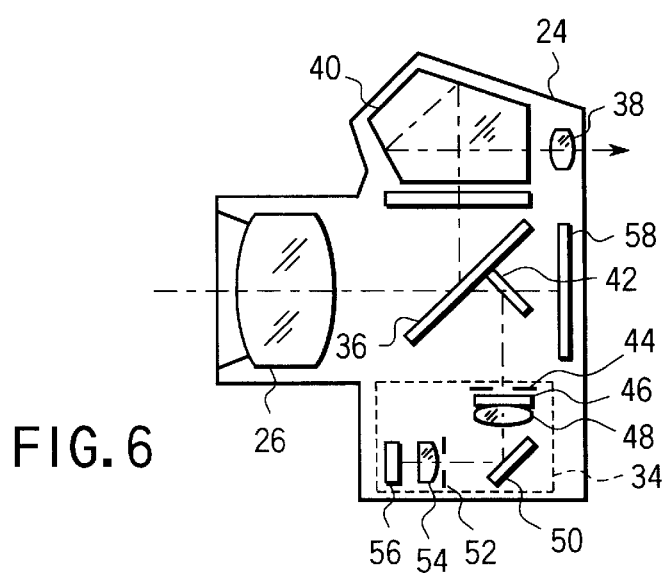
FIG. 6 is a sectional view of a portion around a focal point detection system of a camera having the blurring detection function according to the first embodiment.

FIG. 6 is a sectional view of a portion around the focal point detection system of the camera. In the camera according to this embodiment, a known TTL phase difference detection scheme is employed.

More specifically, this camera has a focal point detection device 34 arranged at the lower portion of the camera body 24. In the camera body 24, a flux of light reflected from an object and passing through the photographing lens 26 is reflected or transmitted by a main mirror 36. The flux of light reflected by the main mirror 36 is guided to a finder 38 through a pentaprism 40. The flux of light passing through the main mirror 36 is reflected by the sub-mirror 42 to be guided to the focal point detection device 34.

The focal point detection device 34 comprises a finder mask 44 for focusing the flux of light passing through the photographing lens 26, an infrared cut filter 46 for cutting infrared rays, a condenser lens 48 for converging the flux of light, a total reflection mirror 50 for totally reflecting the flux of light, a separator diaphragm 52 for controlling the flux of light, a separator lens 54 for refocusing the flux of light, and an AF sensor 56 constituted by a photoelectric conversion element array and a processing circuit therefore. The photoelectric conversion element array is divided into two sections. The sections receive left and right fluxes of light divided by the separator lens 54, respectively.

The 2R is turned on to move the main mirror 36 up, and the flux of light reflected from the object and passing through the photographing lens 26 is guided to a shutter 58.

Figure 7:
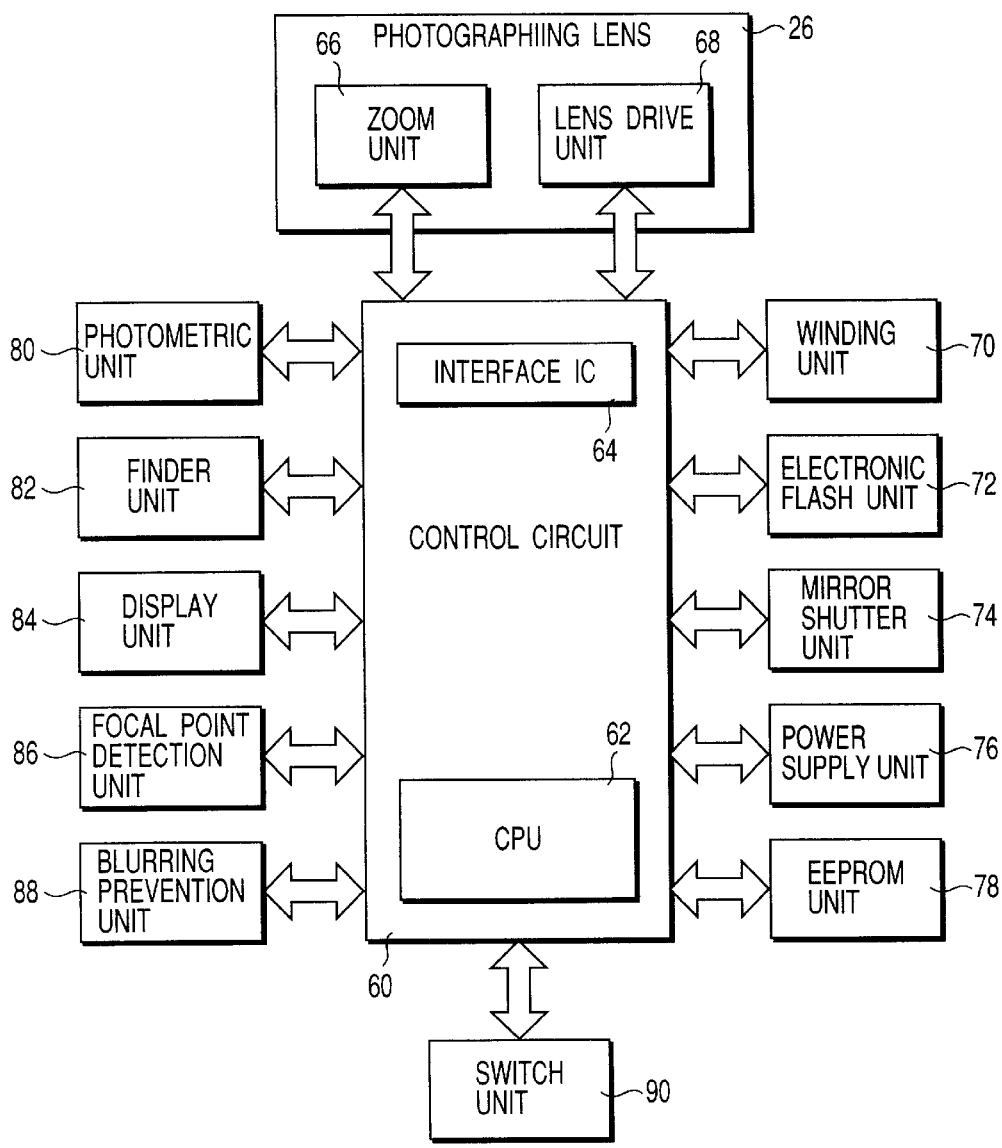
FIG. 7 is a block diagram showing the electric configuration of a camera having the blurring detection function according to the first embodiment.

FIG. 7 is a block diagram showing the electric configuration of the camera.

A control circuit 60 corresponding to the control unit 10, the panning shot check unit 12, and the shutter speed change unit 14 is a controller for entirely controlling the camera, and has a CPU (central processing unit) 62 and an interface IC 64 which are arranged therein. Here, the CPU 62 performs a series of operation control of the camera according to a sequence program that is stored in advance. The interface IC 64 is an IC in which analog circuits are integrated, and has circuits having a function of driving a motor or the like, a photometric function, a function of shaping the waveform of a photo-interrupter (not shown), and the like.

A zoom unit 66, a lens drive unit 68, a winding unit 70, an electronic flash unit 72, a mirror shutter unit 74, a power supply unit 76, an EEPROM unit 78, a photometric unit 80, a finder unit 82, a display unit 84, a focal point detection unit 86, a blurring prevention unit 88, and a switch unit 90 are connected to the control circuit 60.

The zoom unit 66 zooms the photographing lens 26, and the lens drive unit 68 drives a focusing lens to set the lens in an in-focus state. The winding unit 70 winds or rewinds a film (not shown), and the electronic flash unit 72 illuminate the object with flash light.

The mirror shutter unit 74 moves the main mirror 36 up or down, drives a diaphragm (not shown), and opens and closes the shutter 58. The power supply unit 76 converts a battery voltage (not shown) into a predetermined voltage (DC/DC conversion) or checks the battery voltage. The EEPROM unit 78 includes an EEPROM which is a non-volatile ROM in which data can be erased or written. The photometric unit 80 photometers an object brightness to calculate an appropriate shutter speed and an appropriate numerical aperture.

Figure 8:
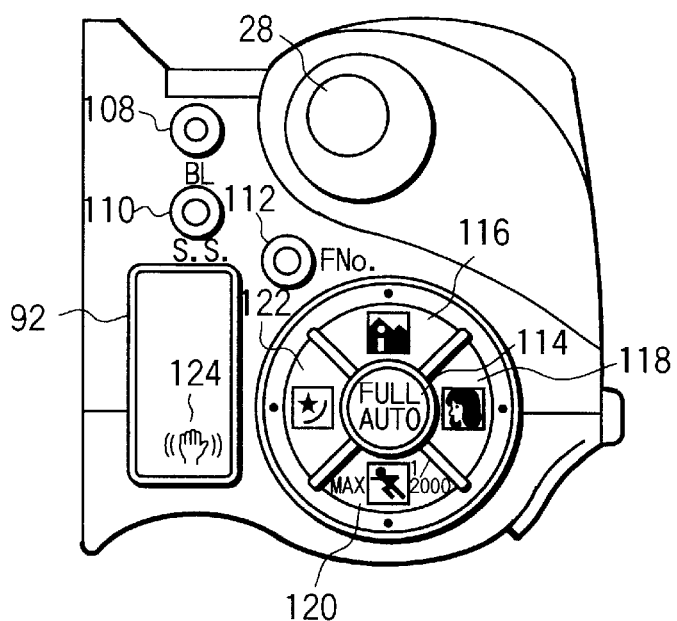
FIG. 8 is a view showing switches arranged around a release switch on the upper surface of the camera having the blurring detection function according to the first embodiment.

The finder unit 82 displays information related to photographing in the finder 38, and the display unit 84 displays a mode and the number of photographed frames in an LCD display unit 92 (see FIG. 8).

The focal point detection unit 86 includes the focal point detection device 34 using the TTL passive scheme, and corresponds to the focal point detection unit 16. The blurring prevention unit 88 detects a blurring of a photographer to perform blurring prevention control, and corresponds the blurring detection unit 18.

The switch unit 90 detects the switch states of various switches arranged on the camera body 24.

Here, a display in the finder by the finder unit 82 will be described below with reference to FIG. 9.

Figure 9:
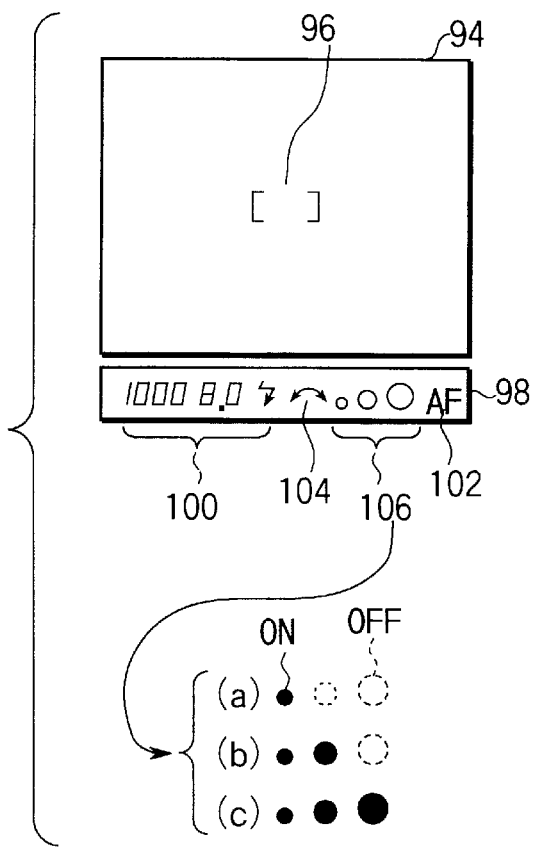
FIG. 9 is an explanatory view of a display in a finder.

Referring to FIG. 9, reference numeral 94 denotes a finder field frame. A focusing frame 96 for detecting a focal point is displayed in the finder field frame 94. An information display unit 98 is arranged below the finder field frame 94. The information display unit 98 comprises a photographic information display portion 100, an in-focus display portion 102, a panning shot success display portion 104, and a blurring display portion 106.

The photographic information display portion 100 displays a shutter speed, a numerical aperture, the presence/absence of electronic flash light, and the like. The in-focus display portion 102 displays whether a focal point can be detected or not. More specifically, the in-focus display portion 102 that is ON represents that the focal point can be detected, and the in-focus display portion 102 which flickers represents that the focal point cannot be detected.

The panning shot success display portion 104 displays whether a panning shot is succeeded or not. More specifically, the panning shot success display portion 104 which is ON represents that the panning shot is succeeded, the panning shot success display portion 104 which is OFF represents that the panning shot fails or is not set.

The blurring display portion 106 is constituted by a plurality of LEDs and represents a current blurring level. For example, as indicated by (a), if one LED is ON, a blurring is small (e.g., 50 µm or less on a film). As indicated by (c), if three LEDs are ON, a blurring is large (e.g., 100 µm or more on a film). As indicated by (b), if two LEDS are ON, a blurring is in a middle level between the state (a) and the state (c). When a vibration isolation mode (to be described later) is set, a blurring level is always displayed.

The LCD display unit 92 included in the display unit 84 and various switches are arranged around the release switch 28 on the upper surface of the camera as shown in FIG. 8.

Here, the BL switch 108 is a switch for selecting whether vibration isolation control is performed by a known technique (to be described later) or not, and the SS switch 110 is a switch for setting a shutter speed. The SS switch 110 can manually select the shutter speed or can automatically select the shutter speed in relation to a full automatic mode (to be described later). An FNo switch 112 is a switch for setting a numerical aperture. The FNo switch 112 can manually select the numerical aperture or can automatically set the numerical aperture in relation to a full automatic mode (to be described later). The FNo switch 112 can also select an aperture-priority mode, a shutter-speed-priority mode, and a manual exposure mode in relation to the SS switch 110.

The full automatic mode switch 114 is operated when a full automatic mode. This full automatic mode is a so-called program mode in which both a shutter speed and a numerical aperture are automatically selected by the camera.

The landscape mode switch 116 is a switch that is operated when a landscape mode is selected. In this landscape mode, a depth of field (a shutter speed and a numerical aperture are determined by the camera to obtain a large numerical aperture). For this reason, the landscape mode is properly used to photograph a landscape.

A portrait mode switch 118 is a switch operated when a portrait mode is selected. In the portrait mode, a depth of field decreases in contrast to the landscape mode. For this reason, the portrait mode is properly used to photograph a person.

A sport mode switch 120 is a switch operated when a sport mode is selected. In the sport mode, a shutter speed increases. For this reason, the sport mode is properly used to photograph a moving object. As a focal point control, so-called moving body prediction control is performed.

A nightscape mode switch 122 is a switch operated when a nightscape mode is selected. In this nightscape mode, exposure can be performed for a long period of time. For this reason, the nightscape mode is properly used to photograph a nightscape.

On the other hand, the LCD display unit 92 displays a mode and the number of photographed frames as described above. In addition, when a vibration isolation mode is selected by operating the BL switch 108, a mark 124 (hand-shaped mark in this embodiment) for representing that the vibration isolation mode is selected is turned on and displayed.

All or some of the LCD display unit 92 and various switches may be arranged on the rear surface of the camera, as a matter of course.

Figure 10:
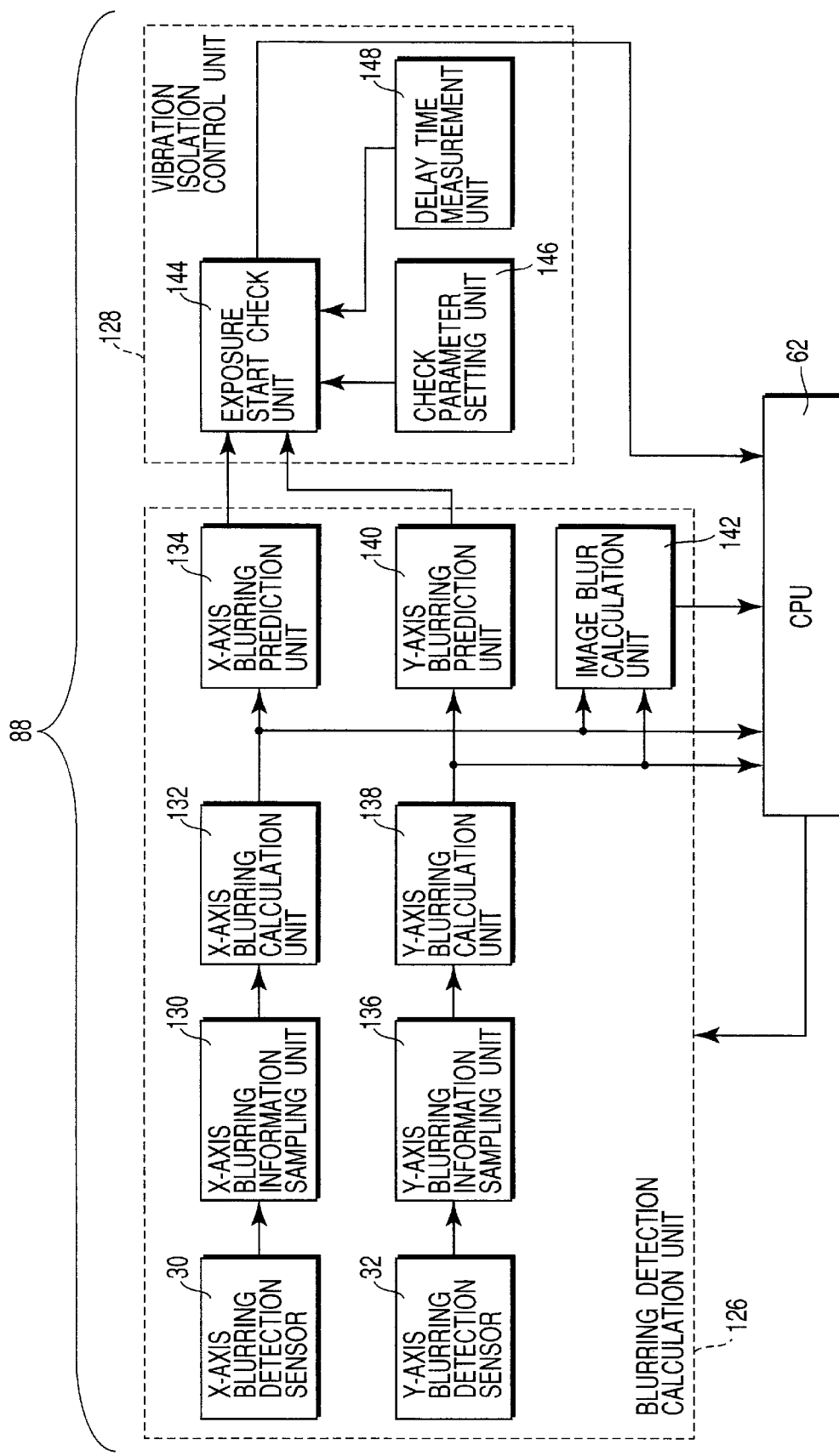
FIG. 10 is a block diagram showing the details of a blurring prevention unit in FIG. 7.

FIG. 10 is a block diagram showing the details of the blurring prevention unit 88.

The blurring prevention unit 88 will be described below by using a technique in which the shutter is controlled such that the shutter is opened at the known timing at which a blurring is small to decreases the influence of the blurring.

The blurring prevention unit 88 is constituted by a blurring detection calculation unit 126 and a vibration isolation control unit 128. Here, the blurring detection calculation unit 126 comprises the X-axis blurring detection sensor 30, an X-axis blurring information sampling unit 130, an X-axis blurring calculation unit 132, an X-axis blurring prediction unit 134, the Y-axis blurring detection sensor 32, a Y-axis blurring information sampling unit 136, a Y-axis blurring calculation unit 138, a Y-axis blurring prediction unit 140, and an image blur calculation unit 142.

The X-axis blurring information sampling unit 130 uses an A/D input port of the CPU 62 and a general-purpose A/D converter to sample an output from the X-axis blurring detection sensor 30.

The X-axis blurring calculation unit 132 performs a filter calculation such as a high-pass filter calculation or a low-pass filter calculation to data sampled by the X-axis blurring information sampling unit 130 to remove a noise component (DC component or high-frequency noise) which is not related to a blurring, thereby calculate an amount of blurring about X-axis. An output from the X-axis blurring calculation unit 132 is sent to the CPU 62 and the image blur calculation unit 142.

A predetermined number of past data of the output from the X-axis blurring calculation unit 132 are stored and left in a RAM (not shown), and the X-axis blurring prediction unit 134 predicts a future blurring state several ten msec after on the basis of the predetermined number of past and present blurring data stored in the RAM. More specifically, the method disclosed in Japanese Patent Application KOKAI Publication No. 5-204012. In short, a prediction calculation is performed by the following equation:

$$\omega_X(t+m) = K_a * \omega_X(t) + K_b * \omega_X(t-10) + K_c * \omega_X(t-20) \quad (1)$$

In this case, $\omega_X(t+m)$ denotes a blurring state value in the direction of an image surface X-axis m [msec] after the present, and equation (1) is used to predict an amount of blurring in exposure. For this reason, although the value m is dependent on an exposure time, the value m is properly set at 10 to 20 msec. In equation (1), $\omega_X$ is a blurring state value in the direction of an image surface X-axis at the present, $\omega_X(t-10)$ is a blurring state value in the direction of an image surface X-axis 10 [msec] before the present, $\omega_X(t-20)$ is a blurring state value in the direction of an image surface X-axis 20 [msec] before the present. The coefficients $K_a$, $K_b$, and $K_c$ are coefficients for a prediction calculation, and are set such that these coefficients make 1.

With this calculation, a blurring state in near future can be predicted on the basis of the present blurring information and the two post blurring information. Equation (1) and the coefficients are shared by the X-axis and the Y-axis on a photographing screen. The result of the prediction calculation is sent to an exposure start check unit 144 of the vibration isolation control unit 128.

The Y-axis blurring information sampling unit 136, the Y-axis blurring calculation unit 138, and the Y-axis blurring prediction unit 140 are equal to the X-axis blurring information sampling unit 130, the X-axis blurring calculation unit 132, and the X-axis blurring prediction unit 134, respectively. The same operations are performed about the Y-axis.

The image blur calculation unit 142 calculates an amount of image blur on a present film surface on the basis of outputs from the X-axis blurring calculation unit 132 and the Y-axis blurring calculation unit 138, focal length information of the photographing lens 26, and exposure time information calculated by the photometric unit 80. The calculation result is sent to the CPU 62 and displayed on the blurring display portion 106.

On the other hand, the vibration isolation control unit 128 starts exposure at a timing at which a small amount of blurring is obtained to control the start of exposure so as to obtain a picture which is slightly adversely affected by blurring. The vibration isolation control unit 128 comprises the exposure start check unit 144, a check parameter setting unit 146, and a delay time measurement unit 148.

Here, the exposure start check unit 144 checks whether a blurring state is large or small according to an algorism (to be described later) on the basis of outputs from the X-axis blurring prediction unit 134 and the Y-axis blurring prediction unit 140. When the small blurring state is set, an exposure start permission signal to the CPU 62.

The check parameter setting unit 146 is a unit in which check parameters used in the exposure start check unit 144 are set. The parameters set here are an allowance of an amount of blurring or information of a maximum exposure waiting time. More specifically, the parameters are set values stored in the EEPROM of the EEPROM unit 78.

The delay time measurement unit 148 measures a time for which an exposure start check is performed, i.e., an occurrence delay time until exposure is started.

Figure 11:
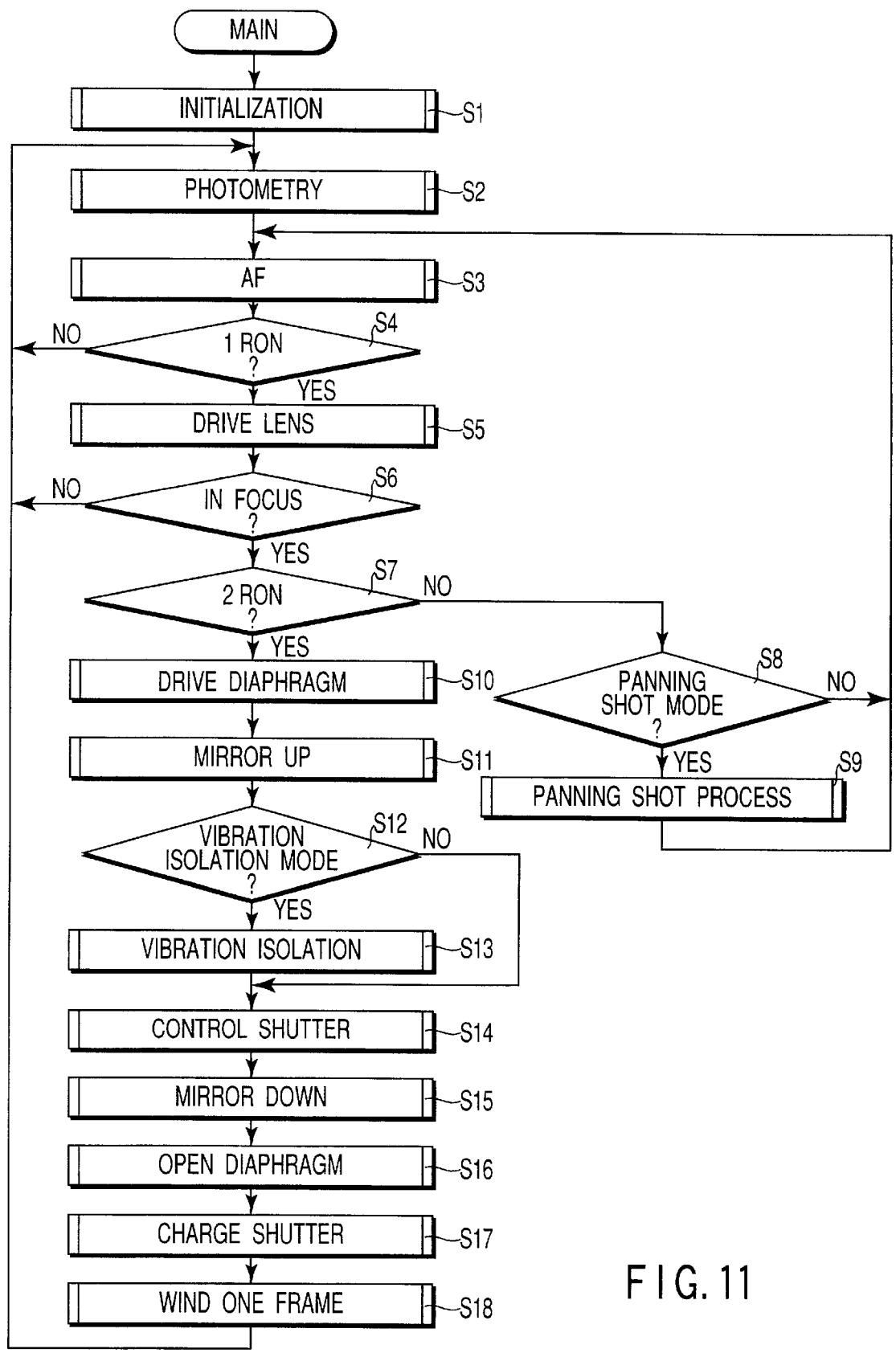
FIG. 11 is a flow chart of a main routine of the camera having the blurring detection function according to the first embodiment.

The operation of the camera having the blurring detection function with the above configuration will be described below with reference to a flow chart of the main routine of the camera shown in FIG. 11.

Initialization is performed to make it possible to perform photographing (step S1). More specifically, when a main switch (not shown) is turned on, the CPU 62 is made power on reset to start the operation, initializes an I/O port, and drives mechanisms for zooming and the like in an initialization state to make it possible to perform photographing.

An object brightness is measured by the photometric unit 80, a shutter speed and a numerical aperture which give an appropriate amount of exposure to a film are calculated (step S2). An in-focus state of the photographing lens 26 is calculated by the focal point detection unit 86 (step S3).

Thereafter, it is checked whether the 1R switch is ON or not (step S4). If the 1R switch is OFF, the flow returns to step S2.

In contrast to this, if the 1R switch is ON, the photographing lens 26 is driven by only an amount of drive calculated in step S3 to be in focus (step S5). As a result of the lens result in step S5, it is checked whether the photographing lens 26 is in focus or not (step S6). If the photographing lens 26 is out of focus, the flow returns to step S2.

If the photographing lens 26 is in focus, it is checked whether the 2R switch is ON or not (step S7). If it is determined that the 2R switch is not ON, it is checked whether a panning shot mode is set or not (step S8). A switch for setting the panning shot mode is not specially arranged in the description in FIG. 8. However, in this embodiment, a case in which the sport mode switch 120 and the BL switch 108 are simultaneously set is defined as the panning shot mode for the following reason. That is, since a moving object is essentially photographed in the sport mode, a small release time lag is preferable. In contrast to this, a time lag is theoretically generated in the vibration isolation mode. Since the two mode are modes which cannot coexist with each other, a mode in which both the modes are set is a panning shot mode in which a laterally moving object is photographed by a panning shot. If the panning shot mode is not set, the flow shifts to step S3.

In contrast to this, the panning shot mode is set, a panning shot process (details of which will be described later) is performed (step S9). Upon completion of the panning shot process, the flow returns to step S3.

When the 2R switch is turned on, "YES" is determined in step S7. In this case, a diaphragm (not shown) is driven by the mirror shutter unit 74 to obtain a value calculated in step S2 (step S10). The main mirror 36 is moved up by the mirror shutter unit 74 (step S11).

Thereafter, it is checked whether a vibration isolation mode is set or not (step S12). More specifically, it is checked whether the BL switch 108 is pressed or not when the vibration isolation mode is not set, the flow shifts to step S14

(to be described later). On the other hand, if the vibration isolation mode is set, a vibration isolation process (details of which will be described later) is performed (step S13).

Upon completion of the vibration isolation process in step S13, or if it is determined in step S12 that the vibration isolation mode is not set, the shutter 58 is opened by the mirror shutter unit 74 for an opening time calculated in step S2 (step S14). The main mirror 36 is moved down by the mirror shutter unit 74 (step S15), and the diaphragm (not shown) is opened by the mirror shutter unit 74 (step S16). In addition, the shutter 58 is charged to an initial position by the mirror shutter unit 74 (step S17). After the film is winded by one frame by the winding unit 70 (step S18), the flow returns to step S2.

Figure 12:
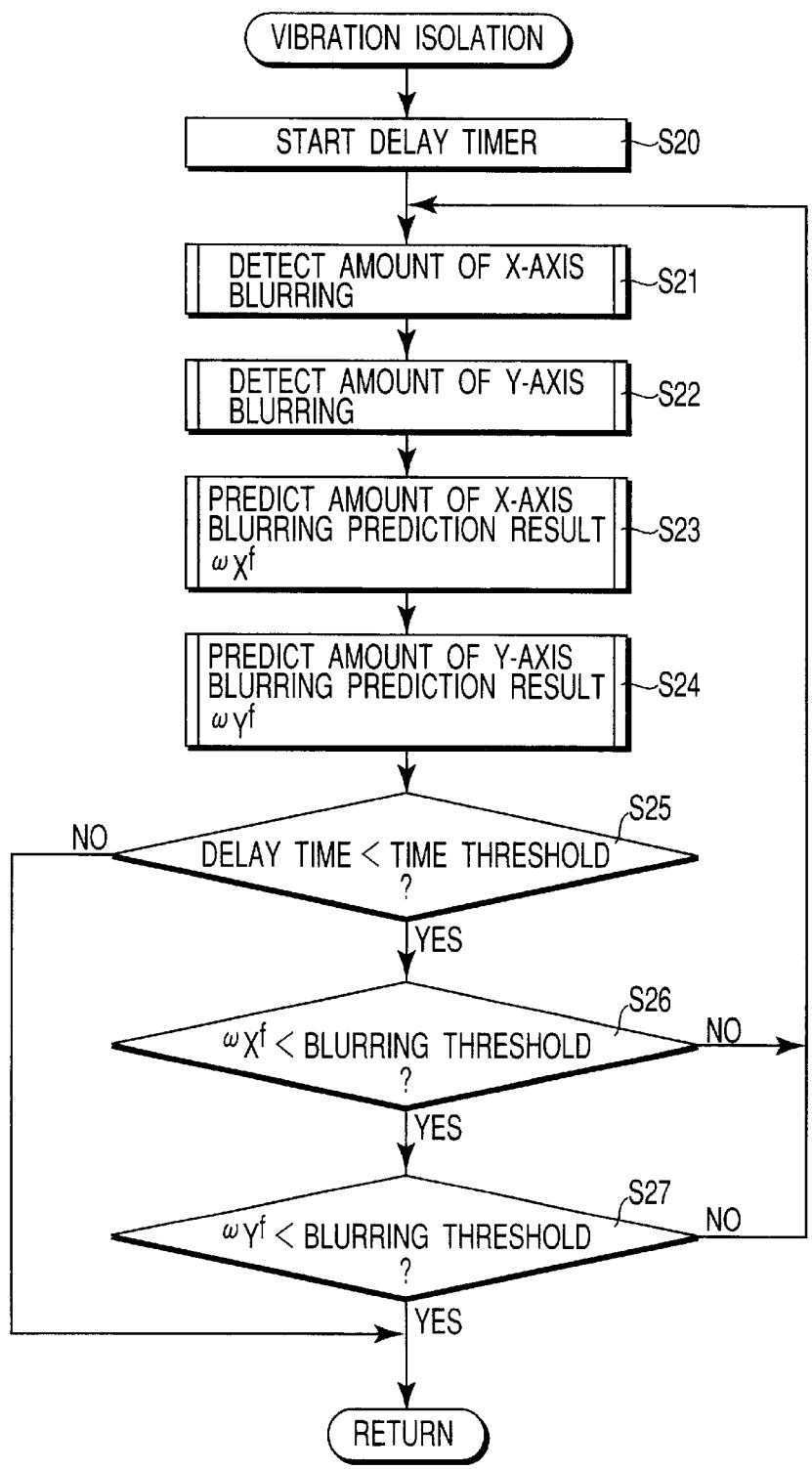
FIG. 12 is a flow chart of the subroutine of a vibration insulation process in FIG. 11.

FIG. 12 is a flow chart of the subroutine of a vibration insulation process called in step S13. This vibration isolation process performs control such that exposure is started at a timing at which a blurring in exposure decreases according to the technique described with reference to FIG. 10.

More specifically, a timer for measuring a delay time of exposure is started by the delay time measurement unit 148 (step S20).

An amount of blurring about the X-axis is detected by the X-axis blurring calculation unit 132 (step S21), and an amount of blurring about the Y-axis is detected by the Y-axis blurring calculation unit 138 (step S22). An amount of blurring $\omega_x f$ in exposure is predicted by the X-axis blurring prediction unit 134 according to equation (1) (step S23), and an amount of blurring $\omega_y f$ in exposure is predicted by the Y-axis blurring prediction unit 140 according to equation (1) (step S24).

Thereafter, here, it is checked whether a timer value measurement of which is started in step S20 is equal to or smaller than the maximum delay time (time threshold) (step S25). If the timer value exceeds the maximum delay time, the flow returns to the main routine.

In contrast to this, if the timer value does not exceed the maximum delay time, it is checked whether the amount of blurring $\omega_x f$ in exposure about the X-axis is equal to or smaller than an allowance (blurring threshold) of an amount of blurring in the check parameter setting unit 146 (step S26). If the amount of blurring in exposure exceed the allowance, the flow returns to step S21 to continue detection.

On the other hand, if the amount of blurring $\omega_x f$ in exposure is equal to or smaller than the allowance, it is further checked whether an amount of blurring $\omega_y f$ in exposure about the Y-axis is equal to or smaller than an allowance (blurring threshold) of an amount of blurring in the check parameter setting unit 146 (step S27). If the amount of blurring in exposure exceeds the allowance, the flow returns to step S21 to continue detection.

In contrast to this, if the amount of blurring in exposure about the Y-axis is equal to or smaller than the allowance, i.e., if both the amount of blurring $\omega_x f$ in exposure about the X-axis and the amount of blurring $\omega_y f$ in exposure about the Y-axis are equal to or smaller than the allowance, the flow returns to the main routine to immediately start exposure.

Figure 13:
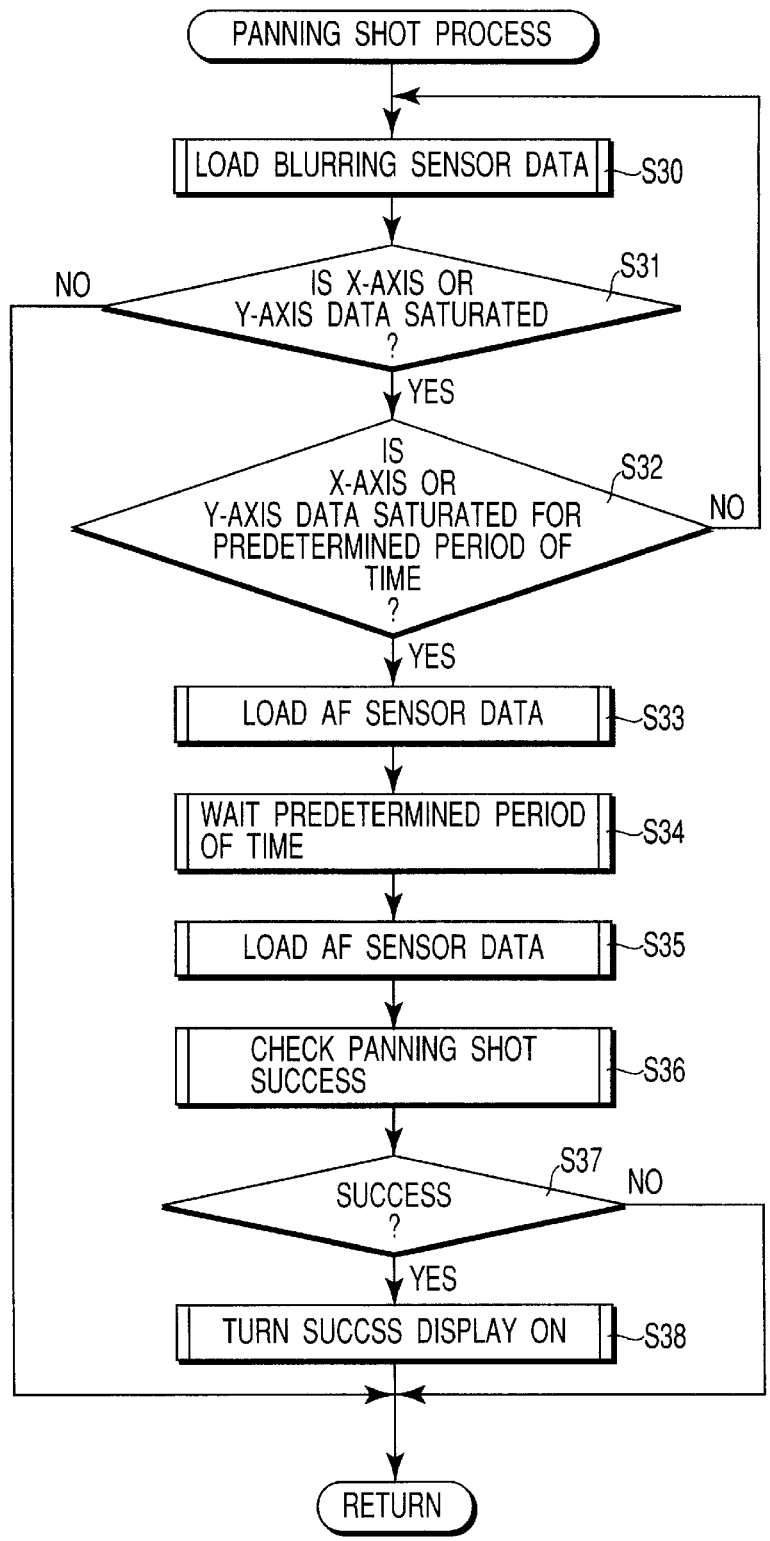
FIG. 13 is a flow chart of the subroutine of a panning shot process in FIG. 11.

FIG. 13 is a flow chart of the subroutine of a panning shot process called in step S9.

More specifically, first, the latest data of the blurring detection sensors 30 and 32 are loaded into a RAM (not shown) in the CPU 62 by the X-axis and Y-axis blurring calculation units 132 and 138 (step S30). It is checked whether one of the loaded blurring data is saturated as shown in FIG. 4 or not (step S31). If the data is not saturated, a panning shot is not performed. For this reason, the flow returns to the main routine.

In contrast to this, when one of the blurring data is saturated, it is checked whether the saturation state continues for a predetermined period of time (step S32). If the saturation state does not continue for the predetermined period of time, the flow returns to step S30 to load the next blurring data.

On the other hand, when the saturation state continues for the predetermined period of time, the AF sensor 56 is controlled by the focal point detection unit 86 to load first AF sensor data into the RAM (not shown) in the CPU 62 (step S33). After waiting is performed to make a loading interval of AF sensor data a predetermined interval (step S34), the second AF sensor data is loaded into the RAM (not shown) in the CPU 62 again as in step S33 (step S35).

Thereafter, a correlation calculation (to be described later) is performed to the two AF sensor data loaded in step S33 and step S35 to check whether a panning shot is succeeded (a panning shot is probably succeeded) or not (step S36). In a panning shot success check process in step S36, if it is determined the panning shot is succeeded, a panning shot success flag is set. Then, the state of the panning shot success flag is checked, so that the panning shot is succeeded or not as a result of the panning shot success check process in step S36 (step S37). If the panning shot is not succeeded, the flow returns to the main routine.

In contrast to this, if the panning shot is succeeded, the panning shot success display portion 104 in the finder is turned on to inform a photographer that the panning shot is succeeded (step S38), and the flow returns to the main routine. The display of the panning shot success display portion 104 is designed to be automatically turned off a predetermined period of time after the 2R switch is turned on to start exposure.

Figure 14:
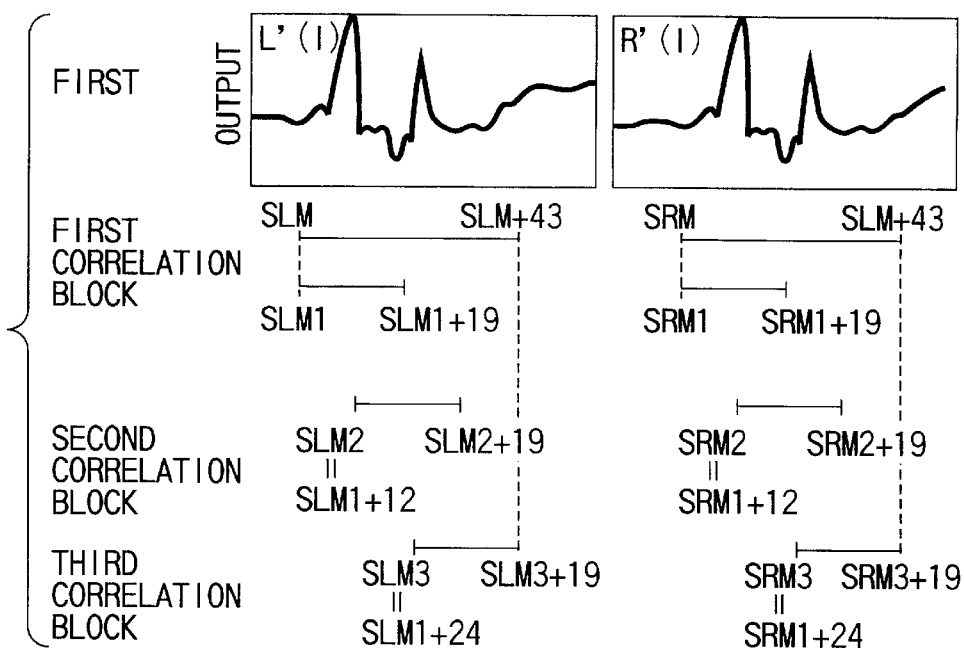
FIG. 14 is a diagram for explaining two correlation calculations of AF sensor data, and a diagram showing blocks for performing correlation calculations to AF sensor data obtained in step S33 in FIG. 13.

Here, the correlation calculation of the two AF sensor data will be described below with reference to FIGS. 14 and 15. FIG. 14 is a diagram showing blocks for performing correlation calculations to AF sensor data obtained in step S33, and FIG. 15 is a diagram showing blocks for performing correlation calculations to AF sensor data obtained in step S35.

In these drawings, L'(I) and L(I) are optical outputs received by a left photoelectric conversion element array, and indicate lines obtained by connecting outputs from adjacent elements as in FIGS. 2 and 3. Similarly, R'(I) and R(I) are optical outputs received by a right photoelectric conversion element array.

In the known AF calculation in step S3, a correlation calculation of left and right images (L'(I) and R'(I)) obtained by performing sensor control once is performed to obtain an interval between the two images, thereby detecting a focal point. However, here, the correlation calculation of L'(I) and L(I) (or R'(I) and R(I)) is performed by applying the AF technique, the reliability of the correlation calculation at this time is checked to determine the degree of coincidence of the two images.

Figure 15:
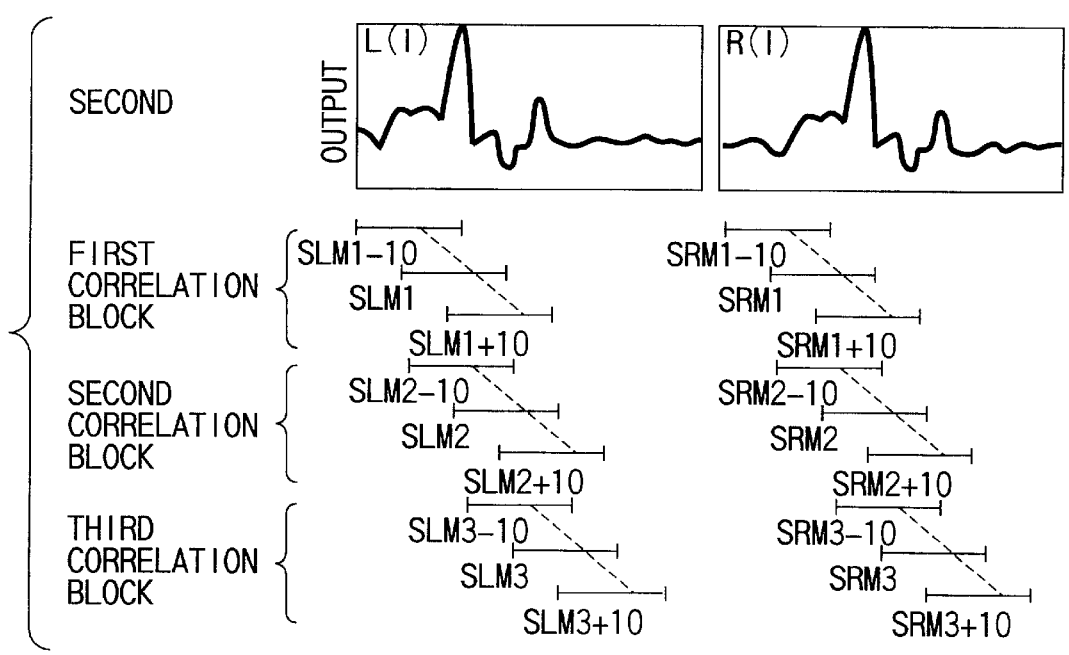
FIG. 15 is a diagram for explaining two correlation calculations of AF sensor data, and a diagram showing blocks for performing correlation calculations to AF sensor data obtained in step S35 in FIG. 13.

As shown in FIGS. 14 and 15, each image is divided into three blocks, and a correlation calculation (to be described later) of the first to the third correlation blocks in FIGS. 14 and 15 is performed to check reliability. Each SLM in the drawings denotes the numbers of the head elements of blocks which have the best correlation when a known correlation calculation between left and right sensor outputs is performed by the focal point detection calculation in step S3. Since the number of elements in the correlation blocks are 44, as shown in FIGS. 14 and 15, the blocks SLM to SLM+43 are divided by three for 20 elements such that the blocks overlap. As a matter of course, all the elements may be divided.

As shown in FIG. 15, the first data in FIG. 14 is fixed, and the second data in FIG. 15 are correlatively calculated such that the data are shifted by −10 elements to +10 elements with reference to the elements at the heads of the blocks. In FIG. 15, the manner of the shift is shown such that the left and right element arrays perform correlation calculations. However, in FIG. 15, since almost equal data are actually output from the left and light element arrays, only a correlation calculation of one of the left and right element arrays (correlation calculation in only the left element array) may be performed.

Figure 16:
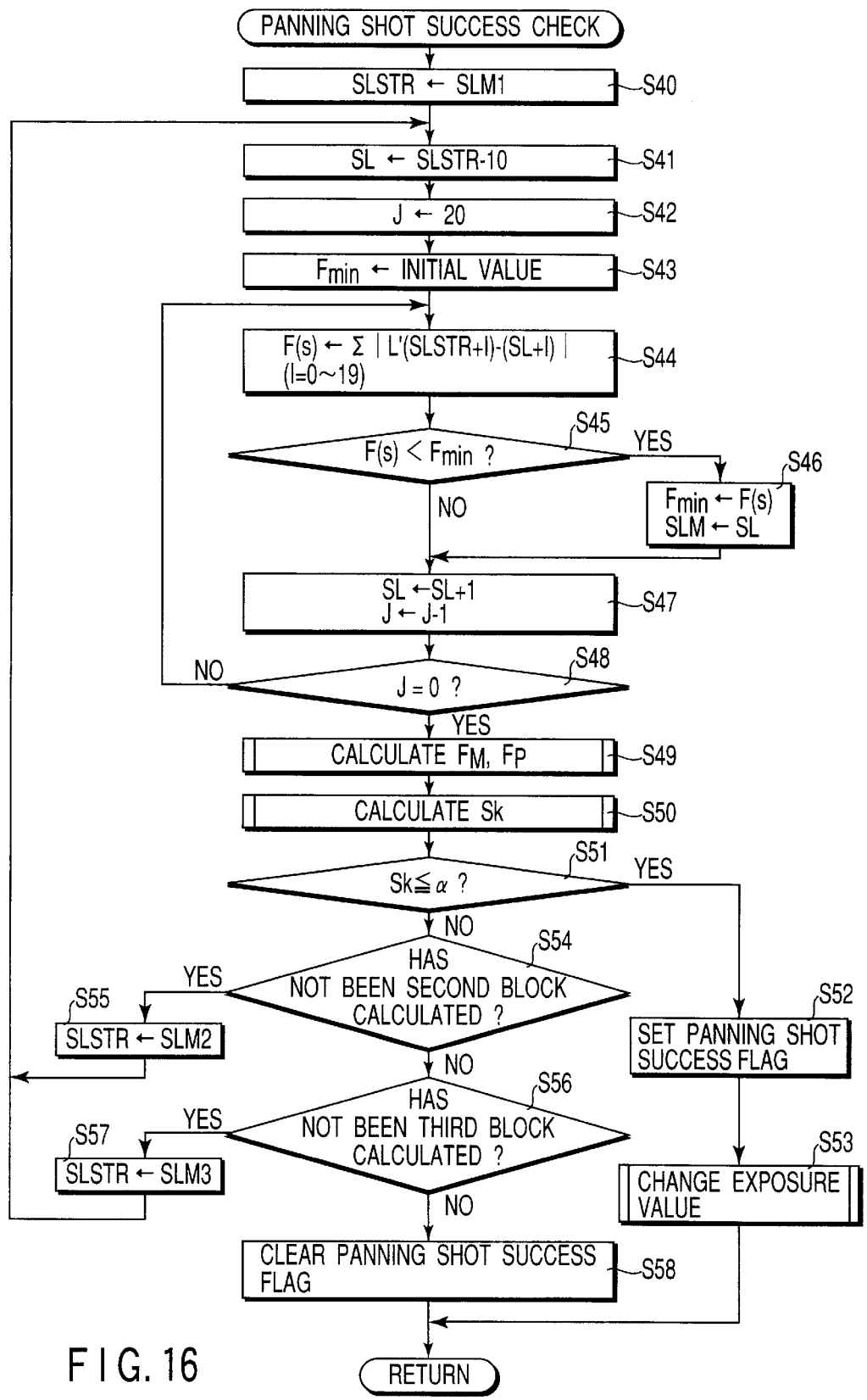
FIG. 16 is a flow chart of the subroutine of a panning shot success check process in FIG. 13.

The correlation calculation will be described below with reference to FIG. 16 which is a flow chart of the subroutine of a panning shot success check process called in step S36. A variable SL is a variable for storing the head number of a small block element array correlatively detected from an object image signal L(I).

SLM1 is substituted for a variable SLSTR (step S40). SLSTR-10 is substituted for the variable SL (step S41). Here, the variable SLSTR denotes an element number at which the correlation calculation is started, and, first, SLM1 is substituted for the variable SLSTR. For this reason, the element number is the head element number of the first correlation block as shown in FIG. 14. An initial value of 20 is substituted for a variable J for counting the number of times of correlation (step S42).

A variable $F_{min}$ representing a correlation result is initialized to a predetermined value (step S43). A correlation output F(s) is calculated on the basis of a correlation equation given by equation (2) described below (step S44):

$$F(s) = \sum_{I=0}^{19} |L'(SLSTR+I) - L(SL+I)| \qquad (2)$$

The correlation output F(s) is compared with the value of the variable $F_{min}$ representing the correlative relationship (step S45). If the value of the variable $F_{min}$ representing the correlative relationship is smaller than the correlation output F(s), the correlation output F(s) is substituted for the variable $F_{min}$ representing the correlative relationship, and the value of an element number variable SL obtained at this time is stored in the variable SLM (step S46). In this case, the number of elements of correlated blocks is 20.

Thereafter, or if it is determined in step S45 that the value of the variable $F_{min}$ representing the correlative relationship is the correlation output F(s) or more, "1" is added to the value of the element number variable SL, and "1" is subtracted from the value of the correlation count variable J (step S47). Then, the value of the correlation count variable J is determined. Until the value of the correlation count variable J becomes zero (step S48), the flow returns to step S44 to repeat the calculation of the correlation equation (2). In this case, although a correlation calculation is performed such that the image is shifted within the range of ±10 elements, this correlation range is determined by a range to be detected.

Next, $F_M$ and $F_P$ calculated according to equation (3) and equation (4) (step S49):

$$F_M = \sum_{I=0}^{19} |L'(SLSTR+I) - L(SLM+I-1)| \qquad (3)$$

$$F_P = \sum_{I=0}^{19} |L'(SLSTR+I) - L(SLM+I+1)| \qquad (4)$$

More specifically, $F_M$ and $F_P$ are correlation outputs obtained when the second image in FIG. 15 is shifted by ±1 element with respect to a block position representing the minimum correlation output.

It is known that reliability index Sk representing the reliability of correlation is calculated by equation (5) and equation (6) described later:

when $F_M \geq F_P$, $$Sk = \frac{F_P + F_{min}}{F_M - F_{min}} \qquad (5)$$

when $F_M < F_P$, $$Sk = \frac{F_M + F_{min}}{F_P - F_{min}} \qquad (6)$$

In the equations, it is known that reliability is high as the value of the reliability index Sk is small (is close to 1) and that reliability is low as the value of the reliability index Sk is large.

The value of the calculated reliability index Sk is checked (step S51). More specifically, when Sk≦α, it is determined that blocks have correlativity, and it is determined that the degree of coincidence of two sensor data of the correlation blocks is high. In this case, α is set at about 7.

When Sk≦α, correlativity is high. For this reason, it is determined that two image coincide with each other. In this case, a panning shot success flag is set (step S52). After an exposure value calculated in step S2 is changed (step S53), the flow returns to the upper routine. The details of an exposure value change process in step S53 will be described later.

In contrast to this, it is determined in step S51 that Sk>α, it is checked whether the second block has been calculated or not (step S54). If the second block has not been calculated, SLM2 is substituted for the variable SLSTR (step S55), and the flow returns to step S41 to subsequently perform the correlation calculation described above to the second block.

If it is determined in step S54 that the second block has been calculated, it is checked whether the third block has been calculated or not (step S56). If the third block has not been calculated, SLM3 is substituted for the variable SLSTR (step S57), and the flow returns to step S41 to subsequently perform the correlation calculation to the third block.

When high reliability cannot be obtained by calculating the first to third blocks as described above, it is determined in step S56 that the third block has been calculated. In this case, it is determined that the two images do not coincide with each other, a panning shot success flag is cleared (step S58), and the flow returns to the upper routine.

Here, although correlation calculations are performed such that the elements are divided into three divided blocks, the number of divided blocks need not be three as a matter of course.

An exposure value changing process in step S53 will be described below with reference to FIG. 17. FIG. 17 is a program line diagram showing shutter speeds and numerical apertures in object brightnesses. The numerical open aperture of the photographing lens 26 is F5.6, and a film sensitivity is set at ISO 100. A solid line in FIG. 17 indicates a line diagram before a photometric value is corrected, and an arrow indicates a manner of correction, and a dotted line extending from an arrow indicates a line diagram after a photometric value is corrected.

FIG. 17 shows an example in a full automatic mode. In this mode, a numerical aperture is corrected such that a shutter speed is 1/15 seconds when an object brightness is EV11 or more. More specifically, the shutter speed will be corrected to 1/15 seconds at a numerical aperture of F16 if the shutter speed is 1/125 seconds at a numerical aperture of F5.6. At brightness of less than EV11, the shutter speed is not corrected since it is lower than 1/15 seconds. Since the exposure value has been calculated in step S2 when the process in step S53 is executed, the change is performed to the exposure value.

The shutter speed of 1/15 seconds is a shutter speed at which a panning shot effect is achieved. When the shutter speed is longer than 1/15, a bluer increases.

FIG. 18 is a table showing photographing modes, the execution or inexecution of a panning shot process, and the execution or inexecution of a success check display.

In FIG. 18, (a) shows the relationship between the execution or inexecution of the panning shot process and the execution or inexecution of the success check display. When the sport mode is set, the panning shot process and a panning shot success display are displayed.

[Second Embodiment]

The second embodiment of the present invention will be described below.

Figure 19:
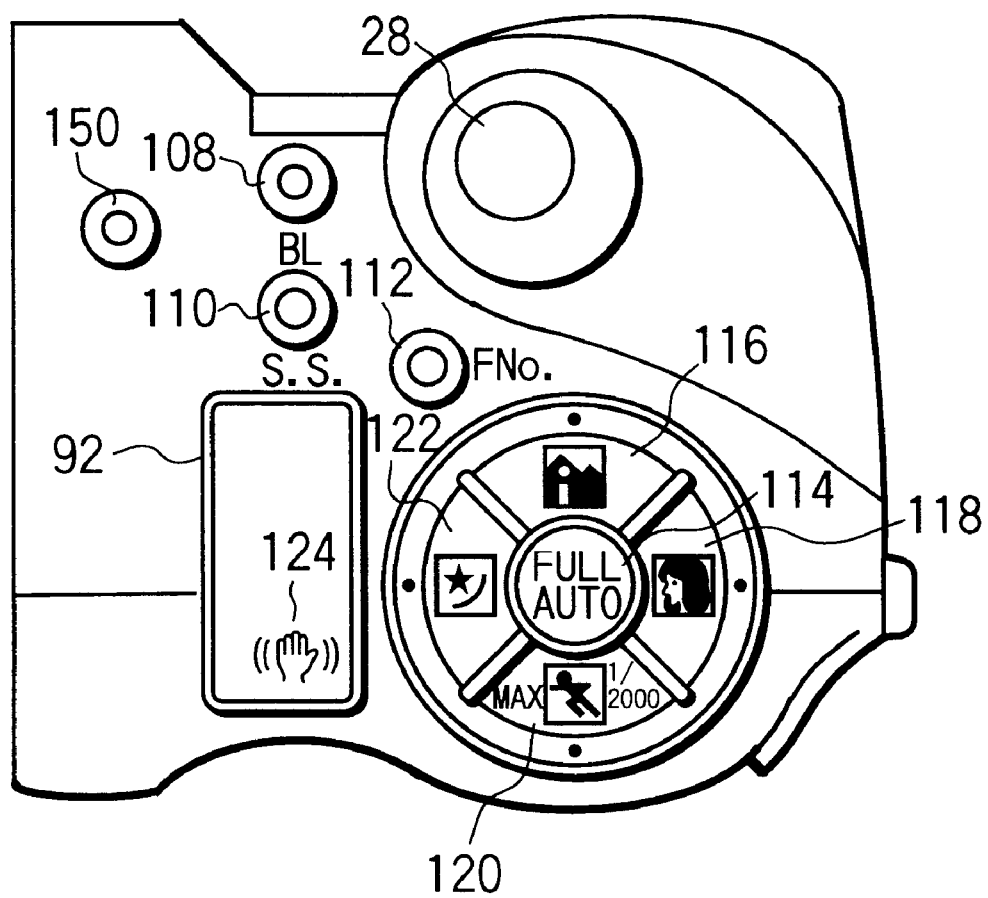
FIG. 19 is a view showing switches arranged around a release switch on the upper surface of a camera having a blurring detection function according to the second embodiment of the present invention.

In the second embodiment, the relationship between the photographing modes, the execution or inexecution of the panning shot process (change in exposure value), and the execution or inexecution of the success check display shown in FIG. 18 is the relationship indicated by (b). More specifically, in the second embodiment, a panning shot mode can be set by a panning shot mode switch 150 as shown in FIG. 19, and is not interlocked with a mode switch unlike the first embodiment. However, in an aperture-priority mode, a shutter-priority mode, and a manual exposure mode, an exposure value is determined by the intention of a photographer. For this reason, in these modes, a display representing whether a panning shot is succeeded or not is performed, but the process of changing an exposure value is not performed.

Figure 20:
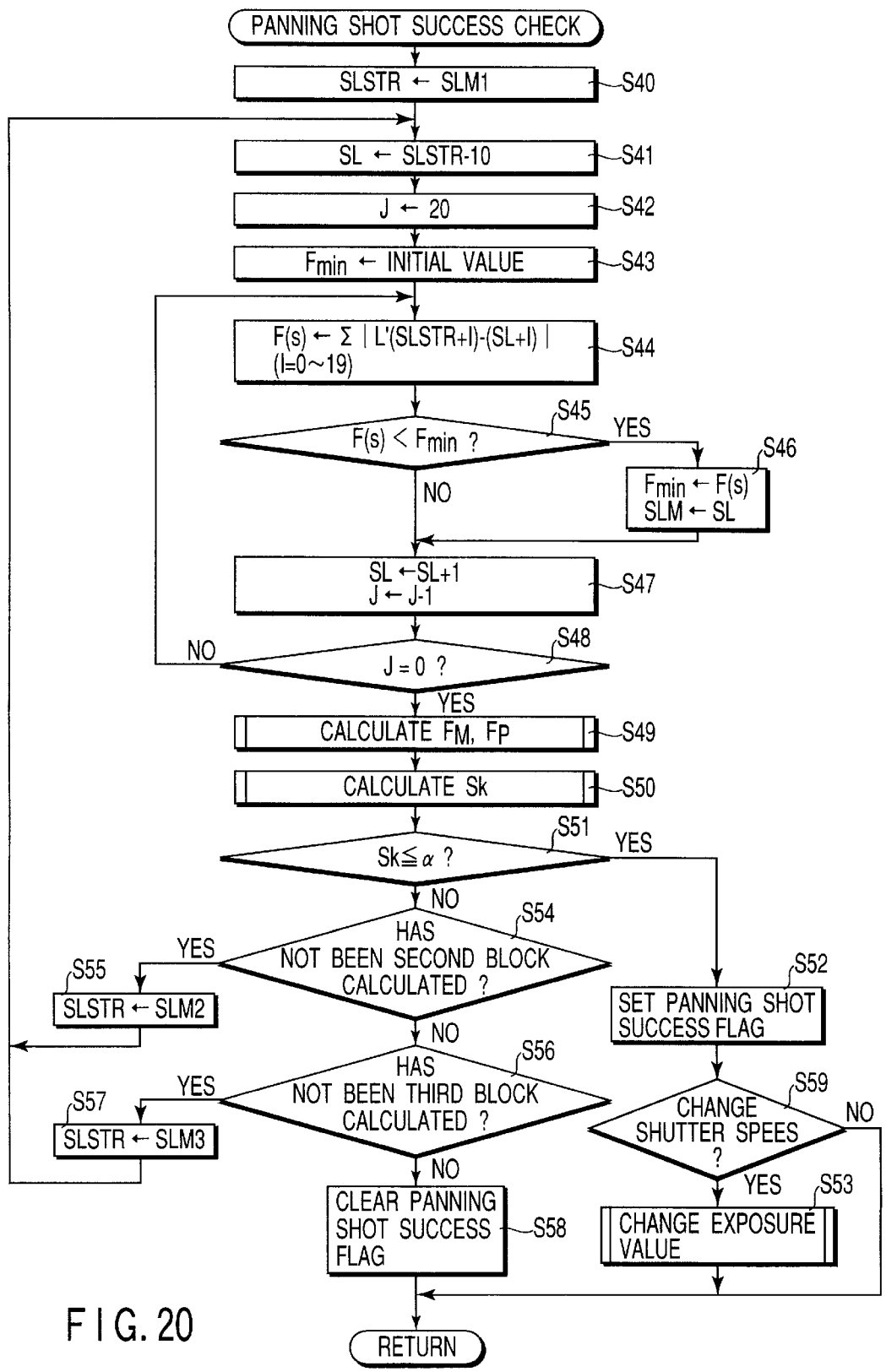
FIG. 20 is a flow chart of the subroutine of a panning shot success check process in the camera having the blurring detection function according to the second embodiment.

In the second embodiment, the subroutine of the panning shot success check process called in step S36 is performed as shown in FIG. 20. In the flow chart in FIG. 16 showing the subroutine of the panning shot success check process in the first embodiment, a check in step S59 is added between step S52 and step S53. More specifically, in step S59, if the mode is determined as a mode (mode in which a shutter speed is not changed) in which an exposure value is determined by the intention of the photographer as described above, the flow returns to the upper routine. In other modes, the process in step S53 is executed.

In this manner, in the second embodiment, in the mode in which the exposure value is determined by the intention of the photographer as described above, a display representing whether a panning shot is succeeded or not is performed, but the process of changing an exposure value is not performed.

The present invention has been described on the basis of the above embodiments. However, the present invention is not limited to the embodiments described above, and various changes and applications of the invention can be effected without departing from the spirit and scope of the invention.

For example, although a blurring detection sensor is illustrated as an angular velocity sensor, any sensor which can detect a blurring may be used. In this case, only the inside of the blurring prevention unit in FIG. 10 and the saturation check of the panning shot check in FIG. 13 are different.

The blurring detection sensor is not limited to a blurring detection sensor incorporated in the camera body 24. The blurring detection sensor can be arranged on the photographing lens 26 side or an exchangeable photographing lens side.

In addition, the vibration isolation technique is described as a known technique for control a shutter such that the shutter is opened at a timing at which a blurring is small. However, a known technique in which the photographing lens is partially driven to cancel a blurring and correct the blurring may be used.

The AF technique is illustrated as the TTL passive scheme. A scheme which can calculate a correlation between sensor data obtained at different times may be used. An external metering scheme may be used.

Furthermore, a method of checking a panning shot on the basis of two focal point detection results. However, a panning shot may be checked on the basis of three or more focal point detection results. In this case, the reliability of the check is improved.

In the above embodiments, the blurring detection sensor is saturated during a panning shot. However, the blurring detection sensor may be controlled not to be saturated by decreasing the gain of the sensor. In this case, although only the panning shot check in FIG. 13 is partially changed, the blurring detection sensor is set to detect a blurring during photo-graphing. For this reason, complex control is required to considerably decrease the gain during the panning operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera having a blurring detection function comprising:
    a blurring detection unit for detecting an amount of blurring;
    a focal point detection unit for detecting an in-focus state of a photographing lens to output a focal point detection signal; and
    a panning shot success check unit for checking whether a panning shot which photographs an object moving in a photographing screen is succeeded or not on the basis of outputs from said blurring detection unit and said focal point detection unit.

2. The camera according to claim 1, further comprising a shutter speed change unit for changing a shutter speed from a high speed to a low speed when it is determined by said panning shot success check unit that the panning shot is succeeded.

3. The camera according to claim 2, further comprising a display unit for displaying a check result of said panning shot success check unit.

4. The camera according to claim 1, further comprising a panning shot mode setting unit for setting the camera in a panning shot mode, wherein
    said panning shot success check unit checks whether a panning shot is succeeded or not when the panning shot mode is set by said panning shot mode setting unit.

5. The camera according to claim 1, wherein said focal point detection unit outputs a first focal point detection signal at first time and a second focal point detection signal at second time a predetermined period of time after the first time.

6. The camera according to claim 5, further comprising a correlation calculation unit for performing a correlation calculation on the basis of the first and second focal point detection signals output from said focal point detection unit.

7. The camera according to claim 6, further comprising a reliability check unit for checking the reliability of a correlation calculation on the basis of an output from said correlation calculation unit.

8. The camera according to claim 7, wherein said panning shot success check unit determines that a panning shot is succeeded when said reliability check unit determines that the reliability of the correlation calculation is high.

9. The camera according to claim 6, wherein said correlation calculation unit performs a correlation calculation such that the first and second focal point detection signals are divided into a plurality of blocks.

10. The camera according to claim 9, wherein said reliability check unit checks reliability on the basis of a correlation calculation result of at least one block of the plurality of blocks.

11. The camera according to claim 1, wherein said blurring detection unit detects an amount of blurring acting on a camera body.

12. A camera having a blurring detection function comprising:
   a blurring detection unit for detecting an amount of blurring;
   a focal point detection unit for detecting an in-focus state of a photographing lens to output a focal point detection signal;
   a panning shot mode setting unit for setting the camera in a panning shot mode;
   a panning shot success check unit for checking whether a panning shot is succeeded or not on the basis of outputs from said blurring detection unit and said focal point detection unit when the panning shot mode is set by said panning shot mode setting unit; and
   a vibration isolation mode setting unit for setting the camera in a vibration isolation mode.

13. The camera according to claim 12, further comprising a photographing mode setting unit having at least a sport mode which is a photographing mode for increasing a shutter speed for a moving object.

14. The camera according to claim 13, wherein said panning shot mode setting unit sets the camera in a panning shot mode when the sport mode is set by said photographing mode setting unit and the vibration isolation mode is set by said vibration isolation mode setting unit.

15. The camera according to claim 12, further comprising a shutter speed change unit for changing a shutter speed from a high speed to a low speed when it is determined by said panning shot success check unit that the panning shot is succeeded.

16. The camera according to claim 12, further comprising a display unit for displaying that the panning shot is succeeded when it is determined by said panning shot success check unit that the panning shot is succeeded.

17. The camera according to claim 16, wherein a display of said display unit is turned off a predetermined period of time after.

18. The camera according to claim 12, wherein said in-focus state detection unit outputs a first focal point detection signal at first time and a second focal point detection signal at second time a predetermined period of time after the first time.

19. The camera according to claim 12, wherein said panning shot success check unit does not check panning shot success when an output from said blurring detection unit is not saturated for a period of time which is not longer than a predetermined period of time.

20. The camera according to claim 18, further comprising a correlation calculation unit for performing a correlation calculation on the basis of the first and second focal point detection signals output from said in-focus state detection unit, wherein
   said panning shot success check unit determines that a panning shot is succeeded when an output from said blurring detection unit is saturated for a period of time which is not longer than a predetermined period of time and when the reliability of a correlation calculation performed by said correlation calculation unit on the basis of the first and second focal point detection signals is high.

21. A camera having a blurring detection function comprising:
   a blurring detection unit for detecting an amount of blurring;
   a focal point detection unit for detecting an in-focus state of a photographing lens to output a focal point detection signal;
   a panning shot mode setting member for setting the camera in a panning shot mode;
   a panning shot success check unit for checking whether a panning shot is succeeded or not on the basis of outputs from said blurring detection unit and said focal point detection unit when the panning shot mode is set by said panning shot mode setting member;
   a vibration isolation mode setting unit for setting the camera in a vibration isolation mode;
   a photographing mode setting unit having at least a photographing mode in which an exposure value is set by the intention of a photographer;
   a shutter speed change unit for changing a shutter speed from a high speed to a low speed when it is determined by said panning shot success check unit that the panning shot is succeeded; and
   a control unit for prohibiting an operation of said shutter speed change unit when the photographing mode in which the exposure value is set by the intention of the photographer is set by said photographing mode setting unit, and for permitting an operation of said shutter speed change unit when the photographing mode in which the exposure value is not set by the intention of the photographer is set by said photographing mode setting unit.

22. The camera according to claim 21, wherein the photographing mode in which the exposure value is not set by the intention of the photographer includes at least an aperture-priority mode, a shutter-priority mode, and a manual exposure mode.

23. The camera according to claim 21, wherein said panning shot mode setting member is a manual operation member which is manually set.

24. A method of performing a panning shot process in a panning shot mode for photographing an object moving in a photographing screen in a camera having a blurring detection function, comprising:
   a panning shot state check step for checking whether the camera is set in a panning shot state;

a focal point detection step for loading a plurality of outputs at different times from a focal point detection unit when it is determined in said panning shot check step that the camera is set in the panning shot state;

a correlation calculation step for performing a correlation calculation on the basis of the plurality of outputs loaded in said focal point detection step;

a panning shot success check step of checking whether a panning shot is succeeded or not on the basis of the correlation calculation in said correlation calculation step; and a display step of displaying that the panning shot is succeeded when it is determined in said panning shot success check step that the camera is set in the panning shot state.

25. The method according to claim 24, wherein said panning shot check step includes:

a blurring detection step of detecting an amount of blurring;

a saturation state detection step of checking whether an output in said blurring detection step is saturated or not; and a time measurement step of measuring a period of time for which the output is saturated.

26. The method according to claim 25, wherein the panning shot process is ended when it is detected in said saturation state detection step that the output is saturated.

27. The method according to claim 25, wherein an amount of blurring is detected again when a period of time for which the output is saturated is shorter than a predetermined period of time in said time measurement step.

28. The method according to claim 24, wherein a shutter speed is changed from a high speed to a low speed when it is determined in said panning shot success check step that a panning shot is succeeded.

* * * * *